United States Patent
Raithel et al.

(10) Patent No.: US 6,796,865 B2
(45) Date of Patent: Sep. 28, 2004

(54) INFLATABLE INSULATION INCORPORATING PRESSURE RELIEF MEANS

(76) Inventors: Ingo Raithel, Krankenhausstr. 2a, D-83043 Bad Aibling (DE); Birgit Schaldecker, Lohmayrweg 1, D-83620 Feldkirchen-Westerham (DE); Holger Zoudlik, Zugspitzstr. 17F, D-83059 Kolbermoor (DE)

( * ) Notice: Subject to any disclaimer, the term of this patent is extended or adjusted under 35 U.S.C. 154(b) by 311 days.

(21) Appl. No.: 10/060,923

(22) Filed: Jan. 30, 2002

(65) Prior Publication Data

US 2003/0106142 A1 Jun. 12, 2003

Related U.S. Application Data

(63) Continuation-in-part of application No. 10/010,722, filed on Dec. 6, 2001.

(51) Int. Cl.[7] .................................................. B63C 9/08
(52) U.S. Cl. .......................................... 441/106; 2/455
(58) Field of Search .............................. 441/106; 2/455

(56) References Cited

U.S. PATENT DOCUMENTS

| 4,091,482 A | 5/1978 | Malcolm | 5/343 |
| 4,646,366 A | 3/1987 | Nishida et al. | 2/108 |
| 4,862,730 A | 9/1989 | Crosby | 73/38 |
| 4,925,732 A | 5/1990 | Driskill et al. | 428/336 |
| 5,005,236 A | 4/1991 | Hutchinson | 5/413 |
| 5,148,002 A * | 9/1992 | Kuo et al. | 219/211 |
| 5,569,507 A | 10/1996 | Goodwin et al. | 428/76 |
| 5,650,225 A | 7/1997 | Dutta et al. | 428/318.4 |
| 5,700,544 A | 12/1997 | Goodwin et al. | 428/76 |
| 5,981,019 A | 11/1999 | Goodwin et al. | 428/76 |

FOREIGN PATENT DOCUMENTS

| GB | 2 317 102 A | 3/1998 |
| GB | 2 323 015 A | 9/1998 |
| WO | WO 01/84989 A1 | 11/2001 |

* cited by examiner

Primary Examiner—Jesus D. Sotelo
(74) Attorney, Agent, or Firm—Dianne Burkhard

(57) ABSTRACT

The present invention is an inflatable module which is breathable, i.e. permits the passage of moisture vapor, and which further incorporates a pressure relief means for reducing pressure in the inflated portion should the module be subjected to sudden or excessive stress. In a preferred embodiment of the invention, a pressure relief valve is incorporated as the pressure relief mechanism in the inflatable module. The present invention is further directed to an inflatable module having increased seal strength to make it capable of withstanding the rigors of use.

20 Claims, 6 Drawing Sheets

INFLATABLE INSULATION INCORPORATING PRESSURE RELIEF MEANS

RELATED APPLICATIONS

The present application is a continuation-in-part of U.S. patent application Ser. No. 10/010,722, filed Dec. 6, 2001.

FIELD OF THE INVENTION

The present invention relates to an inflatable insulation module that is breathable, i.e. permits the passage of moisture vapor. This inventive module can be incorporated in a wide variety of garments such as suits, vests, jackets, trousers, hats, gloves, socks, and boots. It can also be used in sleeping bags and bedcovers. The inventive module allows the wearer to adjust the amount of insulation being provided depending on the environmental conditions experienced or the activities that the wearer is engaging in. The inventive module is also provided with a relief valve means for reducing pressure in the inflated portion should the module be subjected to sudden or excessive stress. In another embodiment, the inventive module is provided with a seam assembly having increased strength to make it capable of withstanding the rigors of use.

BACKGROUND OF THE INVENTION

Inflatable garments are well known in the art. The concept of using an air impermeable water vapor permeable material to form the inflatable portion of an insulating module is also known. U.K. Patent Publication 2,317,102 A describes such a module. The air impermeable, water vapor permeable material taught in that publication is an unsupported elastic material such as a polyurethane. The material must be sufficiently elastic to compensate for the stresses arising as a result of inflation, flexing or impact. In order to have sufficient strength, the material has to have a minimum thickness of 50 microns and is preferably 100–150 thick. As a result of using relatively thick membranes, the breathability of the module is acknowledged to be reduced. In some embodiments, both sides of the inflatable cavity are formed from such relatively thick membranes that it further reduces breathability.

U.K. Patent Application GB2,323,015A describes a variable thermal insulation material with an inflatable layer created from an envelope of breathable material formed from a laminate arrangement of hydrophilic films that are bonded to microporous substrates. This document prefers the combination of microporous and hydrophilic material sold under the trademark GORE-TEX by W. L. Gore & Associates, Inc. The composite article is arranged so that the inflatable cavity is created by hermetically sealing the hydrophilic materials to each other with the microporous substrate on the outside of the hydrophilic film.

While the invention described in U.K. Patent Application 2,323,015A provides many of the advantages of the present invention in practice, garments have tended to leak or rupture when subject to external stresses such as impact. Improvements to overcome these deficiencies in the prior art are contemplated.

These and other purposes of the present invention will become evident from review of the following specification.

SUMMARY OF THE INVENTION

The present invention improves upon and renders practical the invention described in U.K. Patent Application 2,323,015A, as well as other inflatable breathable modules. A wearer may, as a result of athletic activity or carelessness, fall or bump into inanimate objects that place sudden excess pressure on the module most frequently resulting in the splitting of the seams forming the inflatable cavity thereby rendering the module ineffective for further use. U.K. Patent Publication GB 2,317,102 A sought to guard against this problem by using thick unsupported elastic film which, as is acknowledged in that application reduced the breathability of the module.

Previously known methods of manufacture such as the methods described in U.K. Patent Publication GB 2,317,012 A, are based on high energy welding. Two airtight breathable films are joined, commonly through hermetic sealing or high energy welding with or without an adhesive. In general, these welding methods require continuous contact of the films be made to ensure an airtight bond, and would therefore prevent the inclusion of a load bearing structure (fibrous layer) in the seal. To enhance the integrity of the bond, the films used are relatively thick, suffering the disadvantages mentioned above.

Upon inflation of an inflatable module or upon impact of the inflated cavity with an object or the ground, seals may become stressed. Stress can concentrate at angles or endpoints of seals. Microfailures of inflated cavities frequently occur at these stress concentration points, as the stress transfers from the point of the weld or adhesive line to the thin film which is incapable of bearing the stress resulting in microfailures or tears. Film elasticity alone will not prevent microfailures, and in thin breathable, airtight films, microfailures of the fabric will prevent the module from maintaining an inflated or insulated state.

The current invention provides enhanced breathability while at the same time protecting against seam rupture.

In one embodiment, the present invention is an inflatable module having one or more inflatable cavities in the module, wherein the module which is breathable, i.e. permits the passage of moisture vapor, and which further incorporates a pressure relief means for reducing pressure in the inflated portion(s) should the module be subjected to sudden or excessive stress. In a preferred embodiment of the invention, a pressure relief valve is incorporated as the pressure relief mechanism in the inflatable module.

The present invention is also directed to an inflatable breathable module having one or more inflatable cavities in the module, wherein the cavities are formed by sealing one layer of breathable fabric to an adjoining layer of breathable fabric, and which further incorporates a means for increasing the strength of the seals to prevent rupture should the module be subjected to sudden or excessive stress. In preferred embodiment, the seals allow for a continuous bond between the airtight layers and form a structural bond between the inner reinforcing textile layers constituting the interior of the airtight breathable fabrics and the inflatable cavity.

DESCRIPTION OF THE DRAWINGS

The operation of the present invention should become apparent from the following description when considered in conjunction with the accompanying drawings, in which.

DETAILED DESCRIPTION OF THE INVENTION

Figure 1:
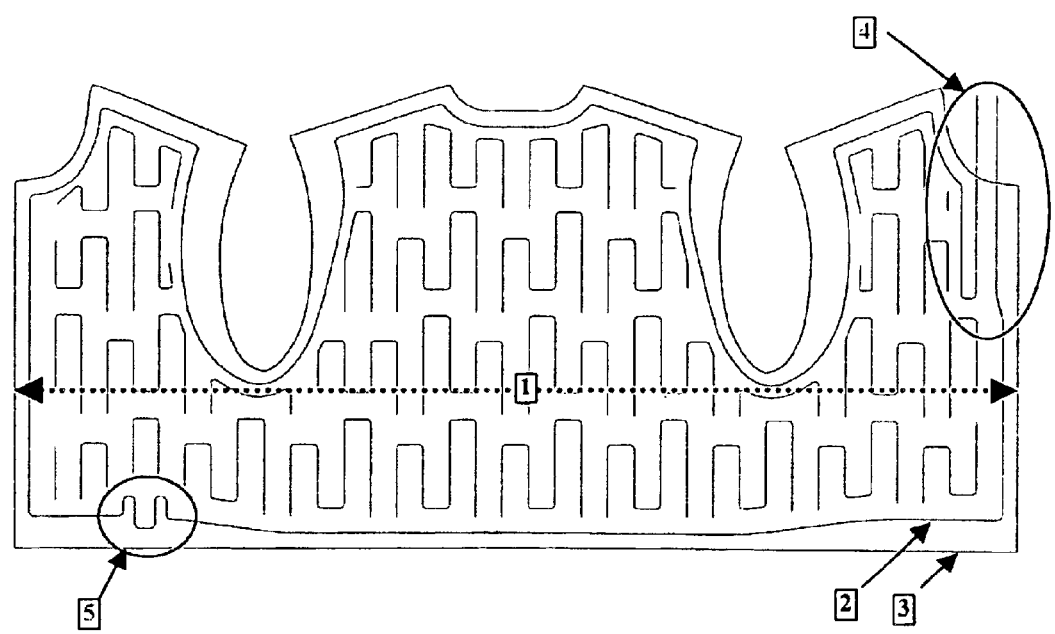
FIG. 1 is a schematic of an inflatable module of the present invention comprising an inflatable insulation jacket or vest insert, the module incorporating a pressure relief valve assembly.

Referring to FIG. 1, there is shown an embodiment of an inflatable module of the present invention comprising an inflatable insert 10 for a garment such as a jacket or vest. The inflatable insert has a width 1 which corresponds to the circumference of the wearer's body when the insert is incorporated into a garment. Sealed perimeter 2 indicates the perimeter of the inflatable cavity 6 formed from the breathable layers. Sealed perimeter 2 may be formed by any appropriate sealing technique, such as adhesive, heat and pressure, high energy welding, etc., thereby forming the sealed inflatable cavity 6. Internal seal lines 7 indicate further optional seals which may be provided between the breathable fabric layers of the module to create a specific inflation pattern within the inflatable cavity 6. Perimeter 3 is the edge of the inflatable insert 10 and corresponds to the cut fabric laminate edge of the insert.

Suitable breathable fabrics which may be incorporated in the present invention may include single layer materials which are inherently air impermeable and moisture vapor permeable, materials which are coated or otherwise treated to render them air impermeable and moisture vapor permeable, or laminates of materials which incorporate an air impermeable, moisture vapor permeable layer. Preferred air impermeable, moisture vapor permeable fabrics which may be incorporated in the novel construction of the present invention typically possess moisture vapor transmission rates in the range of greater than 2000 g/m$^2$/24 hours, more preferably greater than 5000 g/m$^2$/24 hours. A particularly preferred laminate for use in the present invention comprises a laminate containing microporous membrane and an air impermeable, moisture vapor permeable layer.

Inflation valve 4, which may also optionally function as a deflation valve for deflating the cavity, is indicated schematically in the Figure and sealably extends into the inflatable cavity 6. Any suitable inflation or inflation/deflation valve may be incorporated into the module of the present invention, provided it allows for inflation of the vest to the desired degree of inflation and, optionally, allows for deflation of the vest, for example, upon opening the valve. A typical inflation valve incorporated in such inflatable modules may be one which is inflatable by mouth, whereby air is blown into the inflatable cavity 6 by the wearer. In this embodiment, the inflation valve 4 is oriented in a location near the wearer's mouth to provide for easy access for inflation while the insert is worn by the wearer.

Pressure relief valve 5 is also schematically depicted in FIG. 1 and is oriented so as to sealably extend into the inflatable cavity. The pressure relief valve 5 may be located in any desired location on the inflatable cavity.

Figure 2:
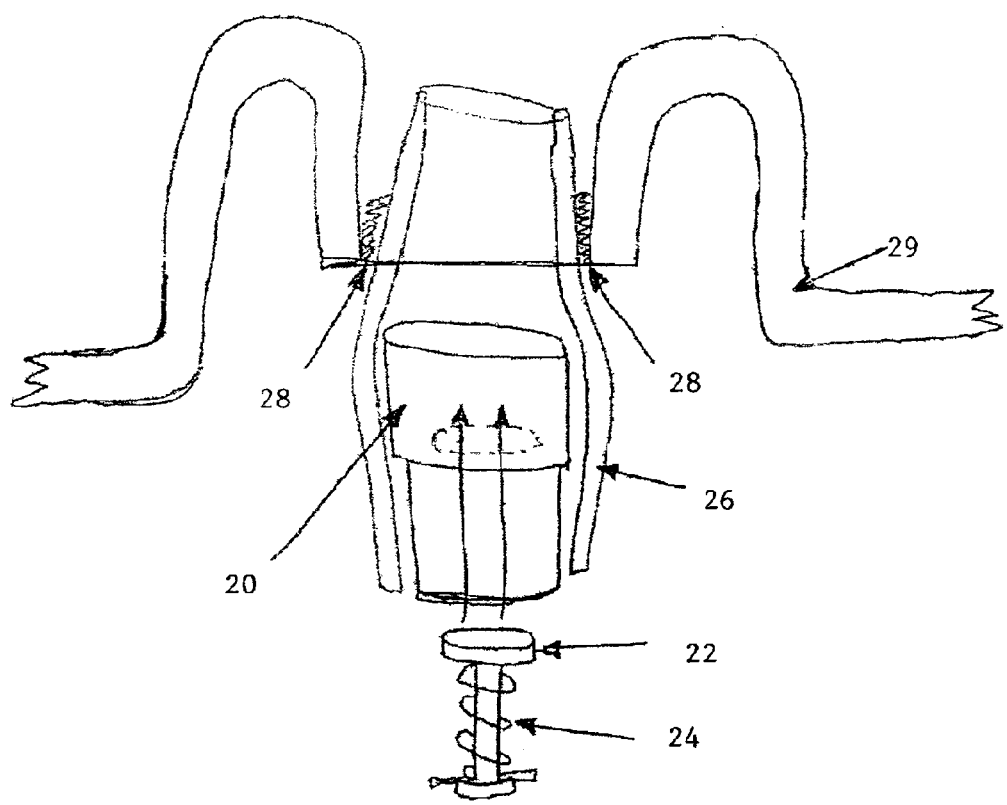
FIG. 2 is a schematic cross-sectional view of a pressure relief valve assembly suitable for use in the present invention.

Referring to FIG. 2, there is shown a detailed schematic cross-section of one suitable pressure relief valve which may be incorporated into the inflatable modules of the present invention. This pressure relief valve 20 includes a poppit 22 having a spring 24 oriented thereon. As mentioned earlier with respect to FIG. 1, the pressure relief valve 20 is incorporated in the inflatable module so that the valve extends into the inflatable cavity 6, as shown. In the embodiment shown in FIG. 2, the relief valve is pressure fit into tube 26, which is adhered by adhesive 28 to the fabric laminate 29.

This pressure relief valve is constructed so that when a relatively higher pressure of a certain psi (pounds per square inch) is imposed on the valve, such as a higher pressure which may result from athletic activity or carelessness, or a fall or bump into inanimate objects placing sudden excess pressure on the module, the spring is compressed and air from within the inflatable cavity is released by the relief valve assembly. However, it would be apparent to an artisan of skill in the art that this pressure relief valve construction is not the only suitable construction which may be adapted for use in the present invention. Moreover, depending on the construction of the module, multiple inflatable cavities may be located in the module, and each inflatable cavity may be provided with inflation means and pressure relief means, as needed, to carry out the desired function of the module.

The pressure relief provided by the pressure relief valve can vary depending on the inflation limitation of the inflatable cavity, the strength of the sealed seams of the inflatable module, the expected sudden stresses that may be imposed on the module, etc. In a preferred embodiment, the pressure relief, or "crack," value (i.e., the pressure at which the pressure relief valve activates) is selected to be in a range of about 0.2 to 3 psi, and more preferably in a range of about 0.4 to 1.5 psi.

An inflatable module is provided such as in FIG. 1, wherein the sealed perimeter 2 may be formed to provide a single inflatable cavity, or optionally more than one inflatable cavity. By "inflatable cavity" or "inflatable module" is meant an envelope formed by sealing air impermeable fabric layers together into a cavity capable of maintaining a pressure differential from its surroundings. In one embodiment, the sealed perimeter 2 incorporates a unique seal assembly forming an airtight joint between at least two breathable fabric layers, thereby forming a sealed inflatable cavity. By "seal" is meant a joint between at least two fabric layers in one embodiment.

Figure 3:
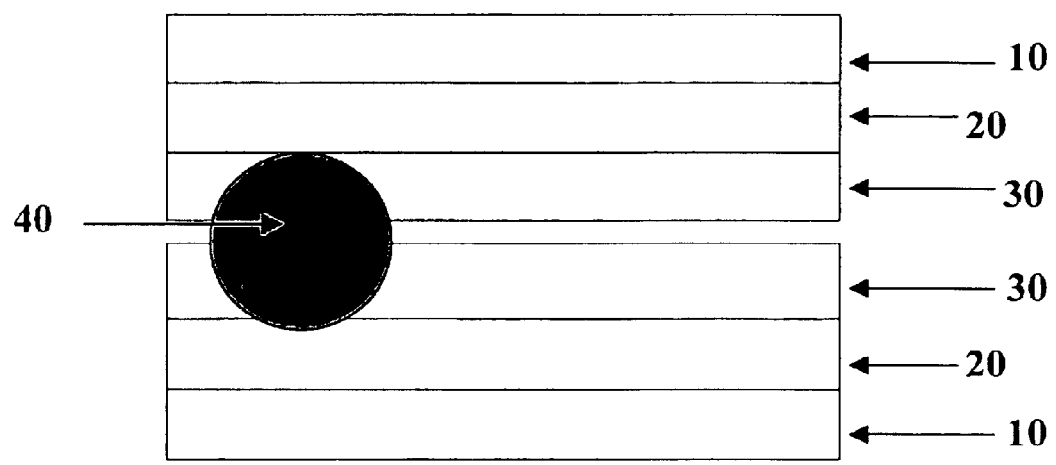
FIG. 3 is a schematic of a seal assembly of the present invention.

A seal assembly of the present invention comprises at least two fabric layers joined together by an adhesive. In a preferred embodiment, a seal assembly (FIG. 3) comprises two breathable fabric layers, each of which comprises an air impermeable, moisture vapor permeable layer 20 and an inner reinforcing textile layer 30. The seal assembly further comprises an adhesive which penetrates the two inner reinforcing textile layers to contact the adjoining air impermeable layers forming a seal 40. Preferably the fibers of the inner reinforcing textile layers are fully penetrated and encapsulated by the adhesive forming a structural seal. A seal is provided optionally to both sealed perimeter and internal seal lines.

By "reinforcing textile layer" is meant a fibrous layer such as a woven, knit or nonwoven material. Preferred reinforcing textile layers of the present invention have sufficient openness to enable a seal to be formed through it. Examples of suitable fibrous sheets include but are not limited to lightweight knits, open nonwovens, open wovens, and multifilament and monofilament knits, comprising at least one of nylon, polyester, polypropylene, cotton and the like.

Suitable breathable fabrics incorporated in the present invention are materials which are inherently air impermeable and moisture vapor permeable and which have reinforcing textile layers. When two breathable fabrics are sealed together, inner reinforcing textile layers from the two breathable fabrics are positioned to face each other forming the interior of the inflatable cavity.

Preferred air impermeable, moisture vapor permeable materials, include but are not limited to polyurethane and composites of polyurethane and PTFE. Preferred polyurethane layers or used as a composite with other materials have a thickness of 0.005 inches or less, most preferably 0.003 inches or less; even more preferred polyurethanes have thicknesses of 0.002 or less, and 0.0015 or less. Polyurethanes with thicknesses of 0.0005 or less are also suitable for use in the present invention. Preferably, the air impermeable, moisture vapor permeable material is laminated or coated on at least one side of a reinforcing textile layer to form a breathable fabric layer. Preferred breathable fabric layers include PTFE/polyurethane composites laminated to knit or nonwoven fibrous sheets, polyurethanes laminated to knits or nonwovens, and particularly preferred are expanded PTFE/polyurethane composites.

Adhesives suitable for use in the present invention include but are not limited to polyurethanes, including reactive polyurethane and thermoplastic polyurethanes, silicones, PVC, and the like.

An adhesive is provided between the inner reinforcing textile layers of the breathable fabrics to be joined. Methods of providing the adhesive to the inner reinforcing textile layer include bead extrusion, printing, and the like. The adhesive is flowed with heat and pressure between the inner reinforcing textile layer of one breathable fabric and the reinforcing textile layer of a second breathable fabric to form a seal. The inner reinforcing textile layers of the first and second breathable fabric layers are encapsulated by the applied adhesive, joining the two breathable fabric layers. By "encapsulated" is meant that the adhesive flows around the fibers of the textile layer and into any interstices, filling the material. In a most preferred embodiment, the adhesive is a reactive adhesive which is flowed in a heated platen press. The adhesive penetrates the first and second reinforcing textile layers, and contacts the adjoining air impermeable layers.

Figure 4:
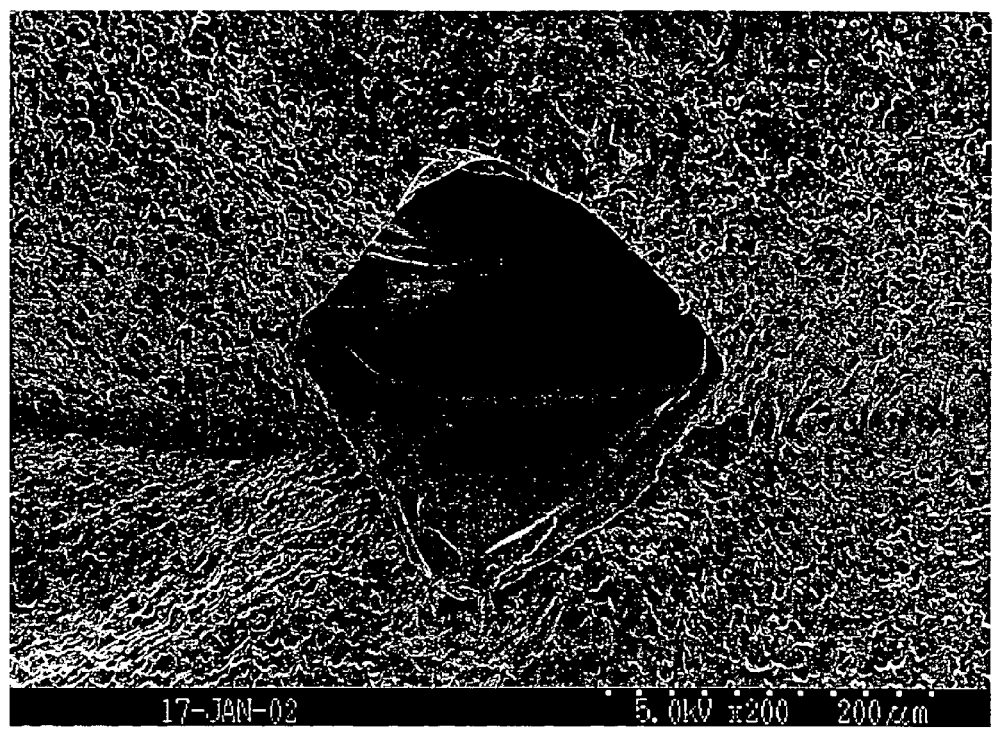
FIG. 4 is an SEM of a microtear in high energy welded polyurethane laminates.
Figure 6:
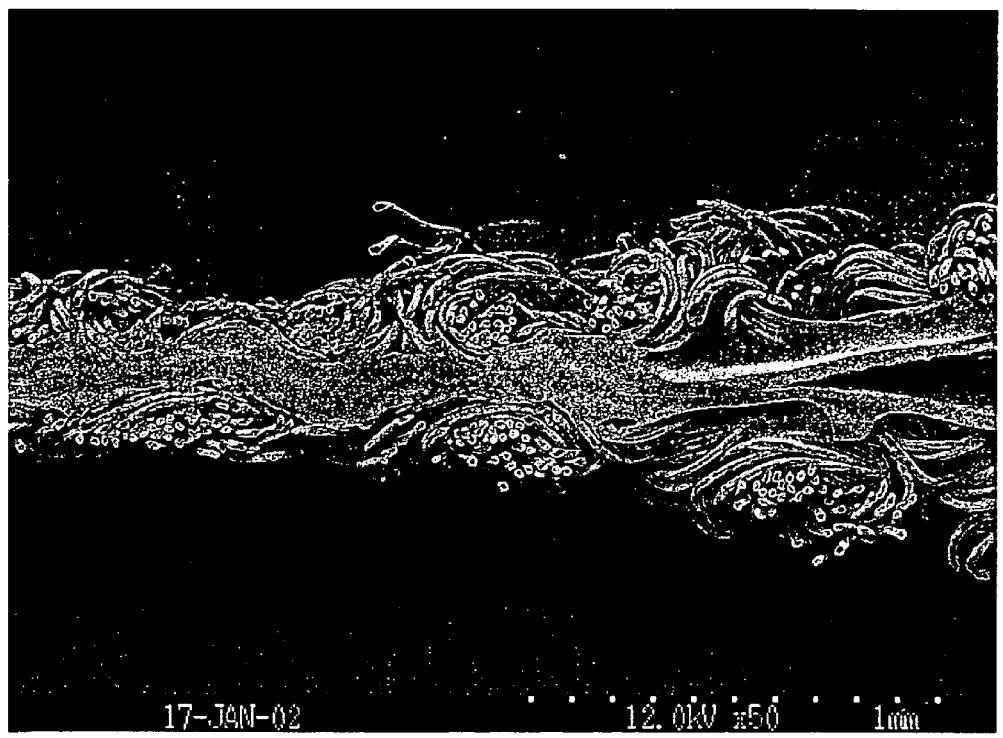
FIG. 6 is an SEM of a cross section of a polyurethane material which was welded.

The encapsulation within the inflatable cavity of both adjoining reinforcing textile layers distributes stress away from the air impermeable film and into the load-bearing inner reinforcing textile layer making the module more suitable for withstanding stress or the concentration of stress without compromising the air-impermeability. It has been surprisingly found that inflatable objects which incorporate a reinforcing textile layer into the seal assembly withstand stresses and are resistant to failures at the internal and perimeter seals. It has been surprisingly found that inflatable modules which have thin airtight films but which incorporate an inner reinforcing textile layer into the seal assembly are stronger and are more resistant to microfailures (FIG. 4) in the airtight films than modules with no reinforcing textile layer or modules which are welded (FIG. 6). FIG. 4 depicts a microfailure resulting from stress in a module formed by weld sealing two polyurethane layers together in the absence of a reinforcing inner textile layer. The use of an inner reinforcing textile layer in preferred inflatable modules of this invention have been found to increase the strength of the module such that the seal strength at break is improved by greater than 50%, preferably by greater than 100%, and even more preferably by 500%, and greater (compared to the strength of a seal between two breathable fabric layers without an inner reinforcing textile layer)

Additional layers may be included in the inflatable modules of the present invention. In a particularly preferred embodiment (FIG. 3 at 10), inflatable modules comprise layers external to the breathable fabric layer, such as an outer shell layer. This may be beneficial where there is an increased likelihood of abrasion or puncture. In a further embodiment, the inflatable module comprises breathable insulation, and a portion of the breathable insulation may be held in place by the adhesive.

The unique combination of a breathable, inflatable module which further incorporates a pressure relief means to protect the module against undesired leaking or rupturing upon being subjected to sudden, excessive external pressure provides advantages which have been heretofore unachievable based on the teachings of the prior art. Moreover, a unique combination of a breathable, inflatable module which incorporates a unique seal assembly to protect the module from stress concentrations resulting in seal failure and microfailure of thin fabric layers is provided. The pressure relief means and seal assembly may be used together or separately to provide protection from stress depending on conditions of use.

Without intending to limit the scope of the present invention, the following example illustrates how the present invention may be made and used.

EXAMPLE 1

An inflatable module of the present invention was constructed in the following manner.

An inflatable vest or jacket insert was fabricated by first cutting two fabric panels having substantially the geometry shown in FIG. 1. Each fabric panel comprised a laminate of a polyester knit shell layer, a microporous expanded PTFE membrane having an air impermeable, moisture vapor permeable polyurethane layer on the membrane side opposite the shell layer, and an inner polyester knit layer. A polyurethane adhesive bead pattern corresponding substantially to the pattern of the perimeter seal 2 and the seal lines 7 of FIG. 1 was applied between the inner knit textile layers, and sufficient pressure and heat were applied so that the adhesive bead penetrated through the inner polyester knit layers and contacted the air impermeable, moisture vapor permeable layer of each laminate to form an airtight seal.

To form an inflation/deflation valve, a fabric tube was formed adjacent the shoulder region of the insert and extending into the inflatable cavity of the insert, as depicted at reference numeral 4 in FIG. 1. The fabric tube was created by the applied parallel adhesive bead lines which sealed the laminates together in a tubular configuration. A silicone tube was then inserted and glued into the fabric tube to form an air-tight seal between the tubes. A plastic inflation valve (Oral Matic Valve 730 ROA, Halkey Roberts, Inc., St. Petersburg, Fla.) was then press fit into the silicone tube, creating an air-tight seal.

To insert the pressure relief valve, a fabric tube was formed adjacent the lower corner region of the insert and extending into the inflatable cavity of the insert, as depicted at reference numeral 5 in FIG. 1. The fabric tube was created by the applied parallel adhesive bead lines which sealed the laminates together in a tubular configuration. A silicone tube was then inserted and glued into the fabric tube to form an air-tight seal between the tubes. A pressure relief valve rated for pressure relief at 0.55 psi pressure (Oral Relief Valve 730 ROARO55, Halkey Roberts, Inc., St. Petersburg, Fla.) was then press fit into the silicone tube, creating an air-tight seal.

The resulting inflatable module was incorporated as a lining insert in a jacket shell.

EXAMPLE 2

A three layer PTFE laminate was sealed using an adhesive bead with an interior fibrous layer. An inflatable module of the present invention was constructed in the following manner.

Figure 5:
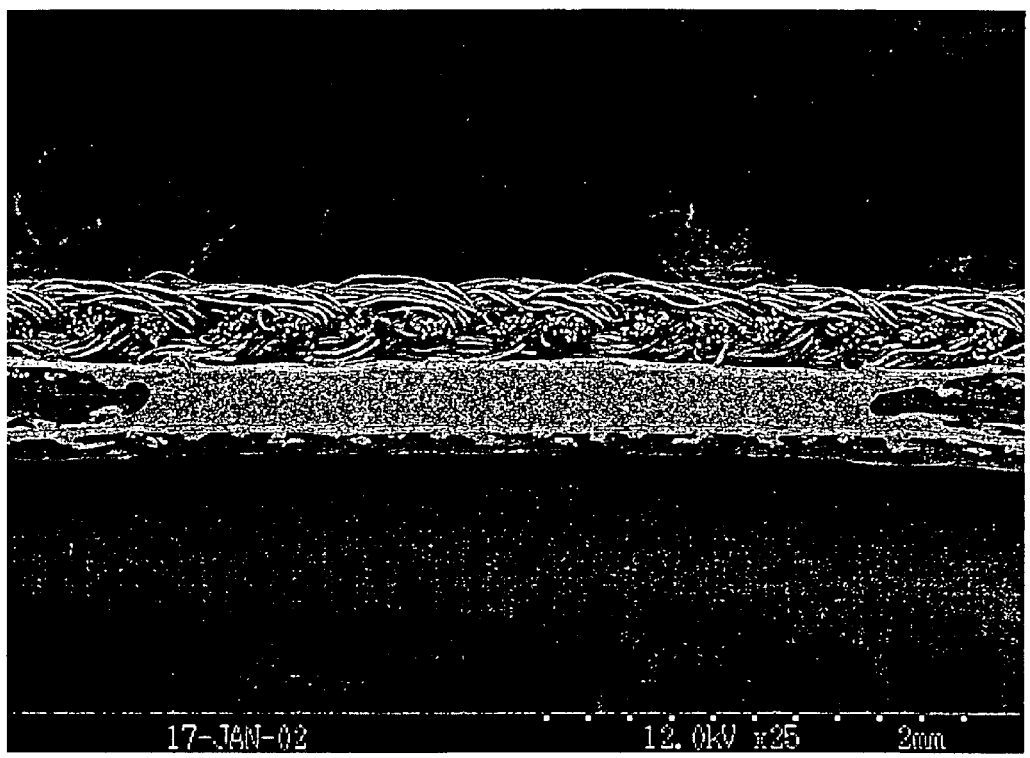
FIG. 5 is an SEM of a cross section of a three layer PTFE laminate having a seal according to one embodiment of the instant invention.

An inflatable vest or jacket insert was fabricated by cutting two fabric panels having substantially the geometry shown in FIG. 1. Each fabric panel, prepared according to FIG. 3, has an outer textile layer 10, a breathable fabric layer 20, and an inner reinforcing layer 30. One fabric panel comprised a laminate of a of 90 g/m2 polyester, circular knit shell layer 10, a 30 micron thick microporous expanded PTFE membrane having a 15 micron thick air impermeable, moisture vapor permeable polyurethane layer on the membrane side 20 opposite the shell layer, and a 30 gsm inner polyester warp knit layer 30. The second fabric panel comprised a laminate of a of 30 g/m2 polyester, warp knit shell layer 10, a 30 micron thick microporous expanded PTFE membrane having a 15 micron thick air impermeable, moisture vapor permeable polyurethane layer on the membrane side 20 opposite the shell layer, and a 30 gsm inner polyester warp knit layer 30. A reactive polyurethane adhesive 40 was applied in a bead pattern corresponding substantially to the pattern of the perimeter seal 2 and the internal seal lines 7 of FIG. 1. The adhesive was applied (approximately 1 grams/linear meter) between the inner knit textile layers. Sufficient pressure (0.2 bar) and heat (125° C.) were applied for a dwell time of about 7 seconds so that the adhesive bead penetrated through and encapsulated the inner polyester knit layers and continuously contacted the air impermeable, moisture vapor permeable layer of each laminate to form an airtight seal as seen in the SEM of FIG. 5. The adhesive was then allowed to cure for a period of at least 48 hours prior to the measurement of seam strength or inflation. Results of the seal strength can be seen in Table 1 below.

TABLE 1

Seal Strength for Examples 2–7.

| | Load/Inch (lbs/linear inch of seal) | | Elongation (%) | |
|---|---|---|---|---|
| | Machine | Transverse | Machine | Transverse |
| Example 3 | 2.7 | 2.5 | 26.3 | 20.4 |
| Example 5 | 4.5 | 2.6 | 28.1 | 131.7 |
| Example 4 | 12.6 | 10.0 | 31.1 | 177.4 |
| Example 6 | 16.7 | 15.8 | 74.6 | 156.1 |
| Example 2 | 17.7 | 12.2 | 38.3 | 84.8 |
| Example 7 | 14.9 | 9.3 | 41.9 | 53.7 |

EXAMPLE 3

A two layer PTFE laminate was sealed using an adhesive bead with no interior fibrous layer. Samples were constructed in the following manner.

A fabric panel comprised a laminate of a 50 g/m² nylon warp knit layer, a 30 micron thick microporous expanded PTFE membrane having a 15 micron thick air impermeable, moisture vapor permeable polyurethane layer on the membrane side opposite the knit layer was laid flat. A thermoplastic polyurethane was melted and a bead of adhesive was applied in both the machine and transverse directions through the use of a pneumatic hot glue gun to the side opposite the knit layer. The adhesive was applied at approximately 1 gram/linear meter. A second fabric panel was immediately placed on top of the first panel with the applied adhesive. The second layer comprised a laminate of a 50 g/m² nylon warp knit layer, a 30 micron thick microporous expanded PTFE membrane having a 15 micron thick air impermeable, moisture vapor permeable polyurethane layer on the membrane side opposite the knit layer. The knit layer of the second panel was oriented away from the first fabric panel. After the second panel was laid, a 6 inch long, 3 inch diameter steel bar was forcibly rolled over the sample to provide approximately 17 bar of pressure while the adhesive was still in a flowable (molten) state.

The applied adhesive continuously contacted the air impermeable, moisture vapor permeable layer of each laminate to form an air tight seal with no interior fibrous layer. The adhesive was allowed to cool prior to the measurement of seal strength. Results of the seal strength can be seen in Table 1.

EXAMPLE 4

A PTFE laminate was sealed using an adhesive bead with an interior fibrous layer. Samples were constructed in the following manner.

A fabric panel comprised a laminate of a 50 g/m² nylon warp knit layer, a 30 micron thick microporous expanded PTFE membrane having a 15 micron thick air impermeable, moisture vapor permeable polyurethane layer to which the knit layer is adhered was laid flat on a table. A thermoplastic polyurethane was melted and a bead of adhesive was applied in both the machine and transverse directions through the use of a pneumatic hot glue gun to the side of the knit layer. The adhesive was applied at approximately 1 gram/linear meter. A second fabric panel was immediately placed on top of the first panel and applied adhesive. The second layer comprised a laminate of a 50 g/m² nylon warp knit layer, a 30 micron thick microporous expanded PTFE membrane having a 15 micron thick air impermeable, moisture vapor permeable polyurethane layer to which the knit layer was adhered. The knit layer of the second panel was oriented towards the knit from the first fabric panel. After the second panel was laid, a 6 inch long, 3 inch diameter steel bar was forcibly rolled over the sample to provide approximately 17 bar of pressure while the adhesive was still in its flowable (molten) state.

The applied adhesive penetrated both knit layers and continuously contacted the air impermeable, moisture vapor permeable layer of each laminate to form an airtight seal with an interior fibrous layer. The adhesive was allowed to cool prior to the measurement of seal strength. Results of the seal strength can be seen in Table 1.

EXAMPLE 5

A two layer polyurethane laminate was sealed using an adhesive bead with no interior fibrous layer. Samples were constructed in the following manner.

A fabric panel comprised of a laminate of a polyester 60 gsm warp knit shell layer and a 25 micron thick air impermeable, moisture vapor permeable polyurethane film (Estane 1710) supplied by Narcoate, LLC was laid flat. A thermoplastic polyurethane was melted and a bead of adhesive was applied in both the machine and transverse directions through the use of a pneumatic hot glue gun to the side opposite the knit layer. The adhesive was applied at approximately 1 gram/linear meter. A second fabric panel was immediately placed on top of the first panel with the applied adhesive. The second fabric panel comprised a laminate of a polyester 60 gsm warp knit shell layer and a 25 micron thick air impermeable, moisture vapor permeable polyurethane film (Estane 1710) supplied by Narcoate, LLC. The knit layer of the second panel was oriented away from the first fabric panel. After the second panel was laid, a 6 inch long, 3 inch diameter steel bar was forcibly rolled over the sample to provide approximately 17 bar of pressure while the adhesive was still in its flowable (molten) state.

The applied adhesive continuously contacted the air impermeable, moisture vapor permeable layer of each laminate to form an airtight seal with no interior fibrous layer. The applied adhesive in the inflatable module was then allowed to cool prior to the measurement of seal strength. Results of the seal strength can be seen in Table 1.

EXAMPLE 6

A polyurethane laminate was sealed using an adhesive bead with an interior fibrous layer. Sample seams were constructed in the following manner.

A fabric panel comprised of a laminate of a polyester 60 gsm warp knit shell layer and a 25 micron thick air impermeable, moisture vapor permeable polyurethane film (Estane 1710) supplied by Narcoate, LLC was laid flat on a table. A thermoplastic polyurethane was melted and a bead of adhesive was applied in both the machine and transverse directions through the use of a pneumatic hot glue gun to the side of the knit layer. The adhesive was applied at approximately 1 gram/linear meter. A second fabric panel was immediately placed on top of the first panel and applied adhesive. The second fabric panel comprised a laminate of a polyester 60 gsm warp knit shell layer and a 25 micron thick air impermeable, moisture vapor permeable polyurethane film (Estane 1710) supplied by Narcoate, LLC. The knit layer of the second panel was oriented towards the knit from the first fabric panel. After the second panel was laid, a 6 inch long, 3 inch diameter steel bar was forcibly rolled over the sample to provide approximately 17 bar of pressure while the adhesive was still in its flowable (molten) state.

The applied adhesive penetrated both knit layers and continuously contacted the air impermeable, moisture vapor permeable layer of each laminate to form an airtight seal with an interior fibrous layer. The applied adhesive in the inflatable module was then allowed to cool prior to the measurement of seam strength. Results of the seal strength can be seen in Table 1.

EXAMPLE 7

A three layer PTFE laminate was sealed using an adhesive bead with a nonwoven interior fibrous layer. An inflatable module of the present invention was constructed in a manner substantially consistent with Example 2, except different fabrics were used. An inflatable vest or jacket insert was fabricated by first cutting two fabric panels having substantially the geometry shown in FIG. 1. One fabric panel comprised a laminate of a of 60 g/m2 polyester, brushed knit shell layer, a 30 micron thick microporous expanded PTFE membrane having a 15 micron thick air impermeable, moisture vapor permeable polyurethane layer on the membrane side opposite the shell layer, and a 25 gsm inner point bonded nonwoven layer. The second fabric panel comprised a laminate of a 25 gsm inner point bonded nonwoven layer, a 30 micron thick microporous expanded PTFE membrane having a 15 micron thick air impermeable, moisture vapor permeable polyurethane layer on the membrane side opposite the shell layer, and a 25 gsm inner point bonded nonwoven layer. The nonwoven of the first fabric panel was oriented towards the nonwoven adhered to the polyurethane layer of the second panel.

The applied adhesive penetrated both nonwoven layers and continuously contacted the air impermeable, moisture vapor permeable layer of each laminate to form an airtight seal with an interior fibrous layer. The applied adhesive was allowed to cure for at least 48 hours prior to the measurement of seal strength. Results of the seal strength can be seen in Table 1.

Test Method
Moisture Vapor Transmission Rate (MVTR)

To determine MVTR, approximately 70 ml. of a solution consisting of 35 parts by weight of potassium acetate and 15 parts by weight of distilled water was placed into a 133 ml. polypropylene cup, having an inside diameter of 6.5 cm. at its mouth. An expanded polytetrafluoroethylene (PTFE) membrane having a minimum MVTR of approximately 85,000 g/m2/24 hrs. as tested by the method described in U.S. Pat. No. 4,862,730 (to Crosby), was heat sealed to the lip of the cup to create a taut, leakproof, microporous barrier containing the solution.

A similar expanded PTFE membrane was mounted to the surface of a water bath. The water bath assembly was controlled at 23° C. plus 0.2° C., utilizing a temperature controlled room and a water circulating bath.

The sample to be tested was allowed to condition at a temperature of 23° C. and a relative humidity of 50% prior to performing the test procedure. Samples were placed so the microporous polymeric membrane was in contact with the expanded polytetrafluoroethylene membrane mounted to the surface of the water bath and allowed to equilibrate for at least 15 minutes prior to the introduction of the cup assembly.

The cup assembly was weighed to the nearest 1/1000 g. and was placed in an inverted manner onto the center of the test sample.

Water transport was provided by the driving force between the water in the water bath and the saturated salt solution providing water flux by diffusion in that direction. The sample was tested for 15 minutes and the cup assembly was then removed, weighed again within 1/1000 g.

The MVTR of the sample was calculated from the weight gain of the cup assembly and was expressed in grams of water per square meter of sample surface area per 24 hours.

Seal Strength Test

To determine the strength of a seal, specimens were cut from inflatable modules of the examples in triplicate in both the machine and transverse directions. Samples were 6 inches long with the seal in the middle. The seal length was 1 inch perpendicular to the axis of pulling. The samples were mounted in an Instron model #1122 equipped with pneumatic clamp jaws to hold the samples firm. The cross head was extended at a rate of 20 inches/minute until the sample broke. The load at break and elongation to break was recorded. The average in both the machine and transverse direction were averaged and reported in Table 1.

While particular embodiments of the present invention have been illustrated and described herein, the present invention should not be limited to such illustrations and descriptions. It should be apparent that changes and modifications may be incorporated and embodied as part of the present invention within the scope of the following claims.

We claim:

1. An inflatable module comprising:
   at least two breathable fabric layers being sealed together by a seal to form an inflatable cavity, each breathable fabric layer comprising an air impermeable, moisture vapor permeable layer and an adjoining inner reinforcing textile layer,
   an adhesive, wherein the inner reinforcing textile layers are encapsulated by the adhesive and the air impermeable, moisture vapor permeable layers are in contact with the adhesive, to form the seal between the at least two breathable fabric layers, and a means for inflating said inflatable cavity incorporated into said module.

2. The inflatable module of claim 1, wherein the at least two breathable fabric layers comprise inner reinforcing textile layers having an air impermeable, moisture vapor permeable coating thereon.

3. The inflatable module of claim 2 comprising a plurality of inflatable cavities formed by a seal, each of the cavities incorporating means for inflation and means for relieving pressure.

4. The inflatable module of claim 1, wherein the breathable fabric layer is a composite.

5. The inflatable module of claim 4 wherein the composite is an ePTFE/polyurethane composite laminated to a reinforcing textile layer.

6. The inflatable module of claim 1, wherein the air impermeable, water vapor permeable layer is selected from a film, knit or nonwoven.

7. The inflatable module of claim 1 wherein the air impermeable, water vapor permeable layer is a polyurethane.

8. The inflatable module of claim 1, wherein the reinforcing textile layer is a woven, knit or nonwoven material.

9. The inflatable module of claim 1, wherein the reinforcing textile comprises at least one of polyester, cotton, or nylon.

10. The inflatable module of claim 1, wherein the adhesive is selected from polyurethane, silicone and PVC polyvinyl chloride.

11. The inflatable module of claim 1, wherein the adhesive is selected from a reactive polyurethane and a thermoplastic polyurethane.

12. The inflatable module of claim 1, wherein the breathable fabric layers further comprise a microporous membrane layer.

13. The inflatable module of claim 1, wherein the module comprises a breathable insulation insert within a garment.

14. The inflatable module of claim 13, wherein a portion of the breathable insulation insert is encapsulated by the adhesive.

15. The inflatable module of claim 1 wherein said inflating means also functions to release pressure for deflation of the module.

16. The inflatable module of claim 1 in which the breathable fabric layer has a moisture vapor transmission rate of greater than 5000 $g/m^2/24$ hours.

17. An inflatable module comprising:
   at least two fabric layers being sealed together by a seal to form an inflatable cavity, each fabric layer comprising an air impermeable, moisture vapor permeable layer and an adjoining inner reinforcing textile layer,
   an adhesive, wherein the inner reinforcing textile layers are encapsulated by the adhesive and the air impermeable, moisture vapor permeable layers are in contact with the adhesive, to form the seal between the at least two fabric layers,
   a means for inflating the inflatable cavity incorporated into the module; and
   a means for relieving pressure in the inflatable cavity when the cavity is inflated and subjected to external stresses exceeding a predetermined amount.

18. The inflatable module of claim 17, in which the means for relieving pressure is a pressure relief valve.

19. The inflatable module of claim 17, wherein the pressure relief valve relieves pressure when the module is subjected to an external stress creating an internal pressure within the inflatable cavity of 0.4 psi or greater.

20. An inflatable module having increased strength comprising
   at least two laminates being sealed together by a seal to form an inflatable cavity, each laminate comprising a breathable fabric having an air impermeable, moisture vapor permeable layer and an inner reinforcing textile layer,
   an adhesive, wherein the inner reinforcing textile layers are encapsulated by the adhesive and the air impermeable, moisture vapor permeable layers are in contact with the adhesive, to form the seal between the at least two laminates, and a means for inflating said inflatable cavity incorporated into said module.

* * * * *